United States Patent [19]

Tanimoto et al.

[11] 4,211,892
[45] Jul. 8, 1980

[54] SYNTHETIC-SPEECH CALCULATORS

[75] Inventors: Akira Tanimoto, Kashihara; Sigeaki Masuzawa, Nara; Shinya Shibata, Nara; Shinzo Nishizaki, Nara, all of Japan

[73] Assignee: Sharp Kabushiki Kaisha, Osaka, Japan

[21] Appl. No.: 877,883

[22] Filed: Feb. 15, 1978

[30] Foreign Application Priority Data

Feb. 15, 1977 [JP] Japan .............................. 52/17798[U]
Feb. 21, 1977 [JP] Japan .............................. 52/19660
Feb. 25, 1977 [JP] Japan .............................. 52/20493

[51] Int. Cl.² ........................... G10L 1/00; G06F 3/16
[52] U.S. Cl. ................................... 179/1 SM; 364/710
[58] Field of Search ...................... 179/1 SM; 364/710

[56] References Cited

U.S. PATENT DOCUMENTS

| | | | |
|---|---|---|---|
| 3,855,461 | 12/1974 | Stockwell | 364/710 |
| 3,878,380 | 4/1975 | Tsuiki | 364/710 |
| 4,000,565 | 1/1977 | Overby et al. | 364/710 |
| 4,060,848 | 11/1977 | Hyatt | 179/1 SM |

OTHER PUBLICATIONS

Article, "Talking Computers", Infosystems, Jul. 1972, pp. A and B.

*Primary Examiner*—Malcolm A. Morrison
*Assistant Examiner*—E. S. Kemeny
*Attorney, Agent, or Firm*—Birch, Stewart, Kolasch & Birch

[57] ABSTRACT

A synthetic-speech calculator includes a keyboard consisting of digit keys and function keys and, if desired, or more mode selectors, a desired number of registers for storing numerical information entered by the depression of selected ones of the digit keys, a read-only-memory for storing a large number of digital codes as sound quantizing information, counter means for specifying the address of the memory so as to take a specific digital code out of the memory, a digital-to-analogue converter for converting the specific digital code taken out of the memory into an audible sound signal, and a loud speaker driven by the audible sound signal and producing an audible sound. There are further provided means for producing audible sounds indicative of not only numerical information but also its associated conditional information having a particular meaning with respect to that numerical information, for example, position information, index information, tabulation information, etc. This numerical information and conditional information is derived in different audible forms.

10 Claims, 8 Drawing Figures

| 0 | 0 | 1 | 2 | 3 | 4 | 5 | 6 |
|---|---|---|---|---|---|---|---|

```
          "line"
        six
          °  "peep"
        one
        two
        three
        four
        five
        six
```

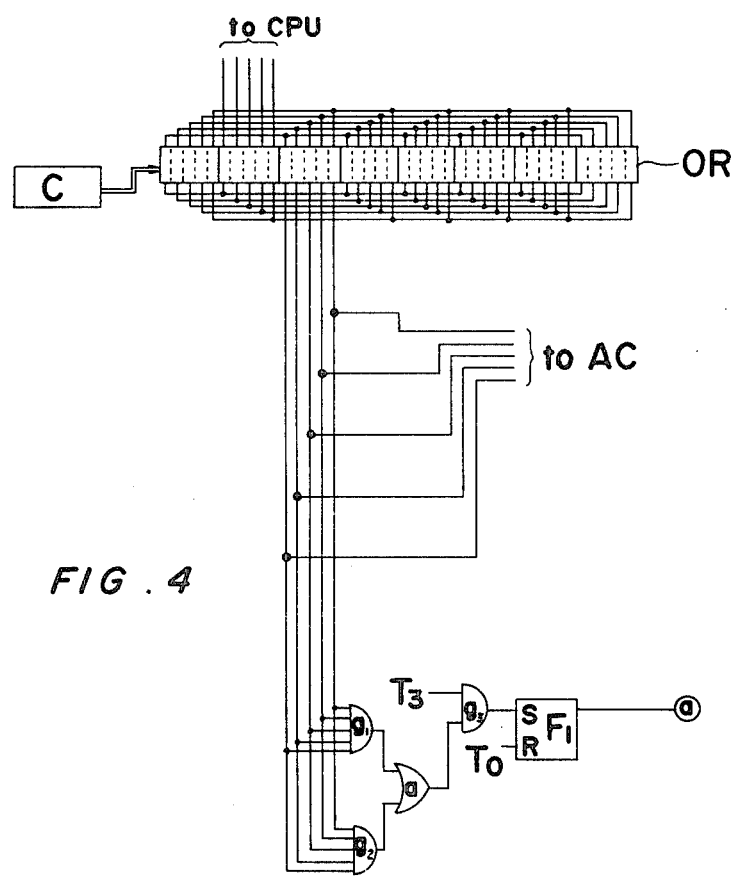

```
 0 0 1 2 3 4 5 6
```

```
    "line"
    six
  •  "peep"
  one
  two
  three
  four
  five
  six
```

SYNTHETIC-SPEECH CALCULATORS

BACKGROUND OF THE INVENTION

The present invention relates to an improvement in a synthetic-speech calculator.

A synthetic-speech calculator is well knwon in the art of calculators. The prior art synthetic-speech calculator was adapted such that respective ones of digit keys and function keys were assigned own unique audible sounds. The operation results or entered information was not easily distinguishable from other information not assigned a unique audible sound, for example, index information and tabulation information.

SUMMARY OF THE INVENTION

Therefore, it is an object of the present invention to provide an improvement in a synthetic-speech calculator which provides audible sounds indicative of not only numerical information but also conditional information having a particular meaning with respect to that numerical information.

In one preferred form of the present invention, a synthetic-speech calculator includes a keyboard consisting of digit keys and function keys, a desired number of registers for storing information entered by the depression of selected ones of the digit keys, a read-only-memory for storing a large number of digital codes as sound quantizing information, counter means for specifying the address of the memory so as to take a specific digital code out of the memory, a digital-to-analog converter for converting the specific digital code taken out of the memory into an audible sound signal, and a loud speaker driven by the audiable sound signal and producing an audible sound. There are provided means for producing audiable sounds indicative of not only numerical information but also conditional information having a particular meaning with respect to that numerical information, such as index information, position information and tabulation information. Sound quantizing digital codes indicative of such conditional information are previously loaded into the read-only-memory.

In the case of a law-of-exponent calculator, distinction codes are interposed between the mantissa portion and index portion. When a decision circuit senses the development of the distinction codes, digital codes indicating exponent information are derived from the read-only-memory. Alternatively, in the case of a conventional calculator, a counter is provided to sense the most significant digit of numerical information contained within a piece of a random-access-memory and provide the output thereof for an address counter associated with the read-only-memory, enabling the loud speaker to produce audible sounds indicative of the most significant digit type position information. This makes it easy for the operator to register operation results in a correct position while these are being delivered in an audible form. Further, pursuant to the teachings of the present invention, it is possible to produce audible sounds indicative of, for example previously selected tabulation information as soon as a power switch is thrown or a specific key is manually depressed.

BRIEF DESCRIPTION OF THE DRAWINGS

Other objects and novel features of the present invention are set forth in the appended claims and mode of operation will best be understood from a consideration of the following detailed description of the embodiments taken in conjunction with the accompanying drawings, wherein;

FIG. 3 shows an example of the contents of a register in case of a law-of-exponent calculator;

FIG. 4 is a circuit diagram which is effective in producing audible sounds indicative of exponent information;

DETAILED DESCRIPTION OF THE INVENTION

Figures 1, 2:
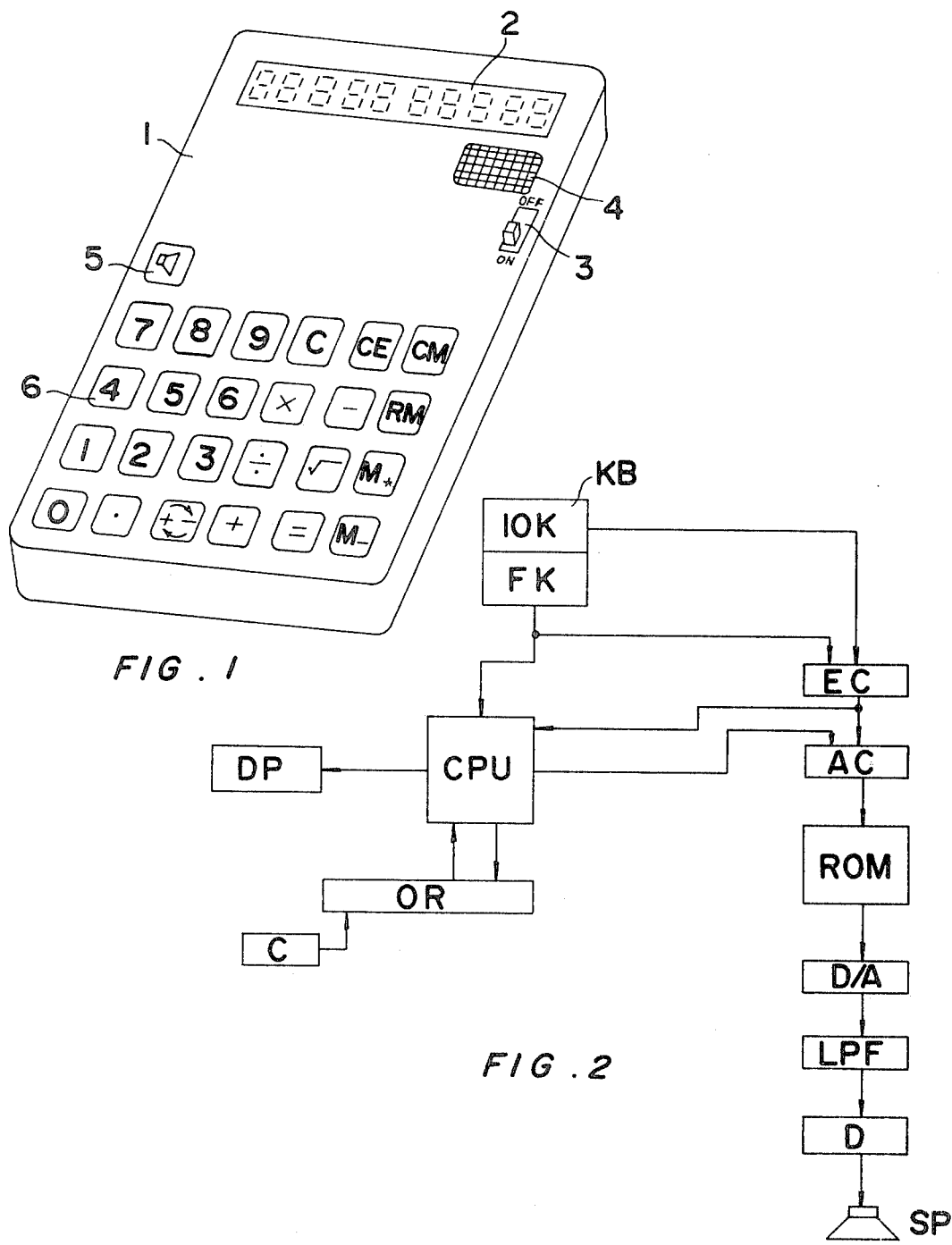
FIG. 1 is a perspective view of a synthetic-speech calculator embodying the present invention.
FIG. 2 is a block diagram of the synthetic-speech calculator shown in FIG. 1.

Referring now to FIG. 1 of the drawings, there is illustrated a perspective view of a synthetic-speech calculator embodying the present invention in the first embodiment which includes a body 1, a display 2, a power switch 3, a loud speaker 4, a sound key 5 available for indicating that keyed information or operation results are to be produced in an audible form, and digit keys and function keys 6. The speech synthesis technique is fully disclosed in many of U.S. Patents, for example, U.S. Pat. No. 3,102,165, SPEECH SYNTHESIS SYSTEM to Genung L. Clapper and U.S. Pat. No. 3,398,241, DIGITAL STORAGE VOICE MESSAGE GENERATOR to Lyle H. Lee.

FIG. 2 illustrates a block diagram of the synthetic-speech calculator. A keyboard KB contains a family of digit keys 10K, a family of functions keys FK, etc. In response to the depression of a specific key, the corresponding signals are introduced into an encoder EC for code conversion. The outputs of the encoder EC are sent to a calculation circuit or central processor unit CPU and an output register OR. Keyed information and operation results are transferred from the output register OR to an address counter AC via the central processor unit CPU. The address counter AC is coupled with a read-only-memory ROM storing a large number of voice quantizing digital codes in advance. The address counter AC provides access to specific areas of the ROM containing selected ones of the voice quantizing digital codes. By the addressing of the ROM, the digital codes indicative of keyed information and operation results are picked up and converted into an audible form via a digital-to-analog converter D/A, a low-pass filter LPF, a speaker driver D and the loud speaker SP. As noted earlier, the ROM stores the digital codes that sample analog voice information containing vocal sounds, syllables, words etc., and quantize them at preselected amplitude levels. Fidelity of the reproduction from the ROM depends largely upon the number of samples and the number of quantizing levels. Amplitude quantum is a binary code and four-level quantizing requires two bits of binary codes, thereby enhancing fidelity. Sixteen-level quantizing with four bits of binary codes is substantially free of distortion.

According to a law-of-exponent calculator, numerical information consists generally of a mantissa and an index as shown in FIG. 3. In a first example (a), the mantissa portion is 1.2345 and the index portion is $10^{12}$ (the twelfth power of 10). Numerical information is stored in the output register OR and distinction codes such as blank codes and negative sign codes are interleaved to establish a distinction between the mantissa portion and index portion. For example, five bits of "01111" are selected for the blank codes and ones of "11111" are selected for the negative sign codes apart from the code representation of numerical information.

These distinction code signals are supplied to the address counter AC. The blank codes "01111" specify the digital codes indicative of distinction sounds between the mantissa portion and index portion, followed by addressing the sound quantizing digital codes corresponding to a word "power" in the tenth power. The thus addressed digital codes are sequentially taken out of the ROM, producing audible sounds via the loud speaker beginning with the mantissa portion. Numerical information indicative of the index portion is then derived in the order of "twelfth", "power", and "of ten". For the example of (b), audible sounds "five", "point", "three", "six", "seven", "multiply", "power", "minus", "power", "of", and "ten" are produced in a sequence.

FIG. 4 shows another preferred form of the present invention wherein a way to produce the mantissa portion in an audible form is different from that for the index portion. The components in the embodiment of FIG. 4 are given the same numbers as in FIG. 2 wherever possible in order to point up the close relationship. While the mantissa portion may be produced digit-by-digit in a audible form despite its digit significance, when producing audible sounds of the index portion. As mentioned previously, the register OR stores the blank codes "01111" and the negative sign codes "11111." Either of these codes are sensed via AND gates g1, g2, an OR gate $O_1$ and an AND gate g3, placing a flip flop $F_1$ into the set condition. When the flip flop $F_1$ is in the set state, the set output a is developed to indicate the next succeeding information relates to the index portion. The set output a of the flip flop $F_1$ is supplied to the ROM to select information while taking digit significance into consideration. In this instance, the sound "power" is necessarily produced after the delivery of audible sounds of the mantissa portion. It is obvious that the present invention is applicable to power calculations.

Figure 5:
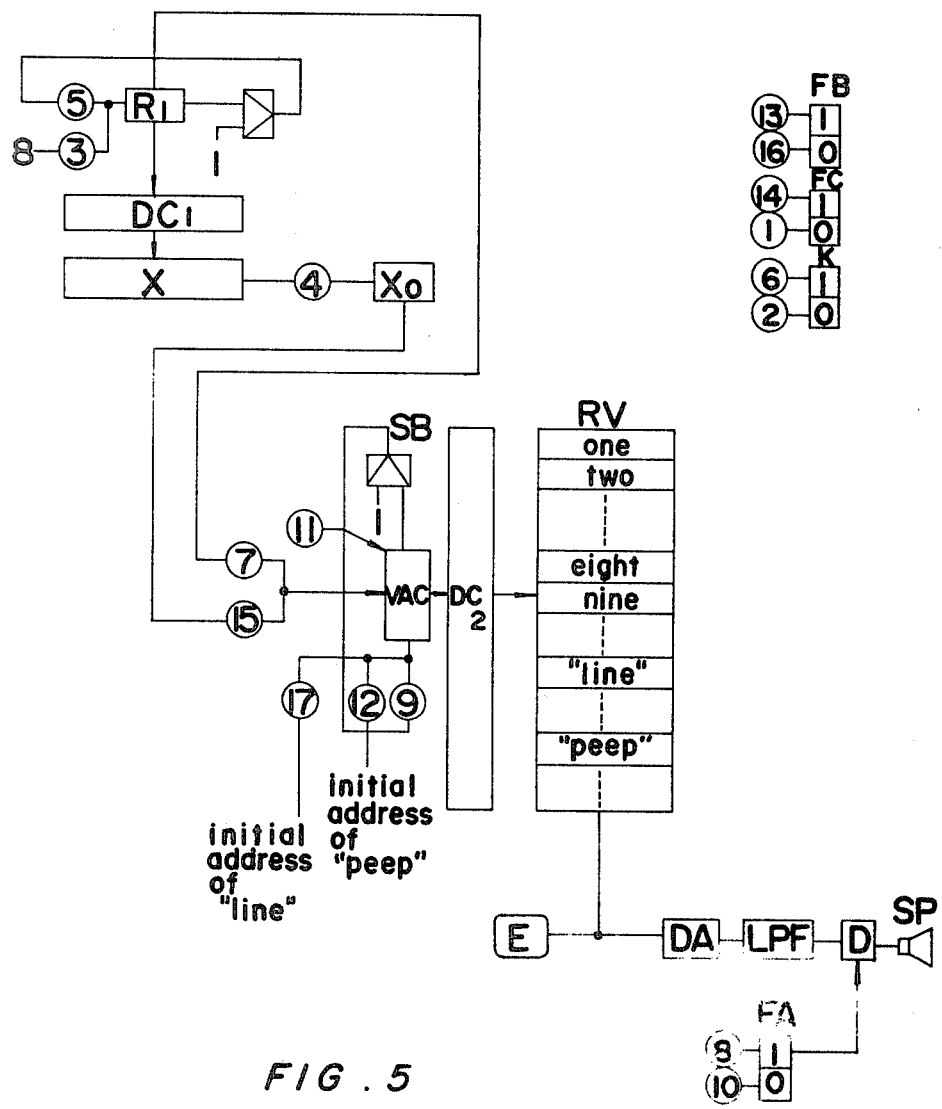
FIG. 5 is a block diagram showing another preferred form of the present invention.

FIG. 5 shows still another embodiment of the present invention the position of the most significant digit of numerical information is indicated in an audible form in advance to the delivery of that numerical information in the case of a conventional calculator. For example, if the most significant digit of numerical information is in the eighth digit position, then audible sounds "line", and "eight" are sequentially produced in accordance with the present invention. In FIG. 5, a register X stores numerical information and an address counter $R_1$ specifies the address of the register X beginning with the most significant digit thereof and ending with the least significant digit. A buffer register $DC_1$ stores the specific digit position of the register X which is addressed by the address counter $R_1$.

An address counter VAC sequentially addresses the ROM RV, producing audible sounds indicative of not only numerical information contained within the register X but also position information indicative of the position of the most significant digit position of that numerical information. For the purpose of the invention three decision circuits or latches $F_B$, $F_C$ and K are provided. Mode of operation of the synthetic-speech calculator shown in FIG. 5 will be described referring to a flow chart of FIG. 6. Assume now that numerical information contained within the register X is "123456" as in FIG. 7.

Initially, the latches $F_C$, $F_B$ and K are reset for operation in the steps $n_1$, $n_2$ and $n_3$. The address counter $R_1$ is loaded with "8" in the step $n_4$ (that is, the most significant digit is at the eighth position). The step $n_5$ permits the contents of the register X specified by the address counter $R_1$ to be transferred into the buffer register $X_0$. Information at the eighth digit position of the register X is $\phi$ entered into the buffer register $X_0$. Because the latch K is initially in the reset state, the step $N_7$ is advanced where decision is effected as to whether $X_0=0$ to inhibit spurious display of upper "$0_S$". If $X_0$ is "0", the address counter $R_1$ is one reduced in the step $n_8$. Therefore, $R_1=7$. The step $n_5$ (X→$X_0$) is returned where information at the seventh digit position of the register S is shifted into the buffer register $X_0$. These steps are repeatedly carried through. The seventh-digit information is entered into the buffer register $X_0$, proceeding toward the step $n_8$ because of $X_0=$). $R_1-1$ is effected with $R_1=6$. In the next step $n_5$ (X→$X_0$) $X_0\neq0$ is established for the first time ($X_0$ receive "1" at this time). The latch K is placed into the set state in the step $n_8$, followed by the step $n_9$. Under the circumstances the address counter VAC specifies the initial address. The procedure L→VAC in the step $n_9$ allows the initial address of an area of the ROM containing the sounds "line" to be specified. Thereafter, the flip flop $F_A$ is set in the step $n_{10}$, starting to produce audible sounds "line." The step $n_{11}$ deals with decision as to whether the output of the ROM is an END code, which is usually loaded at the end of each word. The address counter VAC keeps on incrementing in the step $n_{12}$ to complete the production of audiable sounds "line" until the END code is reached. Upon the END code sensed the flip flop $F_A$ is reset in the next step $n_{13}$ and the address counter VAC is also reset in the step $n_{14}$. The address counter VAC in the reset state does not specify any of the respective areas of the ROM. The latch $F_C$ is reset in the step $n_{15}$, followed by the step $n_{16}$ because of $F_C=0$. The procedure $R_1=0$ means decision as to whether the overall contents of the register X including the least significant digit position or the first digit position have been taken out, and a terminating requirement for the procedure 8→$R_1$ in the step $n_4$. The $n_5$ step is reverted to effect operation X→$X_0$ when $R_1\neq0$. The address of the register X remains unchanged $R_1=6$ with the buffer $X_0$ loaded with "1". The latch K is set in the step $n_8$ to make up a sequence of the events $n_{16}→n_{18}→n_{19}→n_{20}$. After setting the flip flops $F_B$ and $F_C$, $R_1$→VAC is achieved in the step $n_{21}$. $R_1=6$ specifies an area of the ROM containing voice "SIX". The chained steps $n_{10}→n_{14}$ allows sounds "six" to be produced via the loud speaker. The latch $F_C$ in the step $n_{15}$ reveals that $F_C=1$ in the preceding step $n_{20}$, proceeding toward the steps $n_{15}→n_{16}$. The procedure →VAC in the step $n_{16}$ is effected for the reason that a simple sound for example "peep" is to be unterposed between "line six" and "numerical data." Thus, the initial address of an area containing a sound "peep" is specified. After →VAC, the latch $F_C$ is reset in the step $n_{17}$ to return back to the step $n_{15}$. A sequence of the steps $n_{15} \to n_{16} \to n_5$ is carried through because $F_C$ in the reset state in the step $n_{17}$. $X \to X_0$ is a data input to the sixth digit position of the X register as ever. The steps $n_6 \to n_{18} \to n_{22}$ are effected so that the address counter $R_1$ for the X register is decremented with $R_1 = 5$. The procedure $X_0 \to VAC$ in the step $n_{23}$ is to specify the initial address of an area of the ROM containing audible sounds "one" which corresponding to "1" at the sixth digit position. Audible sounds indicative of numerical data are produced in the next succeeding steps $n_{10} \to n_{14}$.

Figures 6, 7, 8:
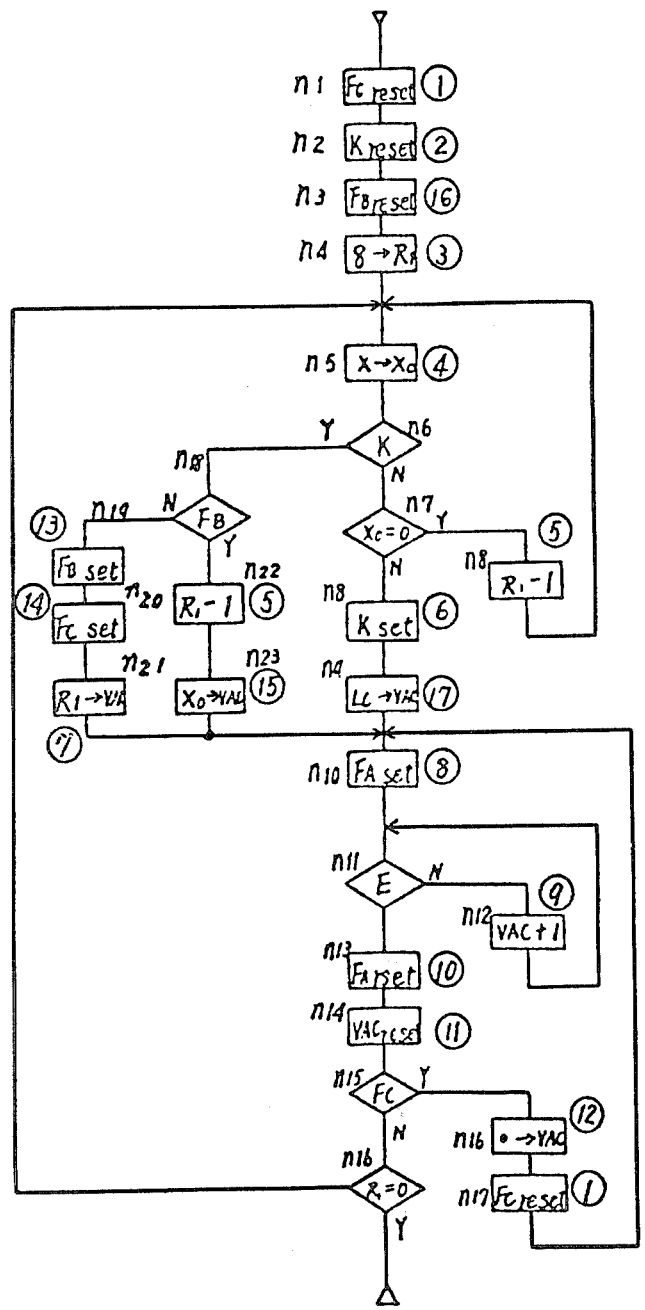
FIG. 6 is a flow chart provided for the purpose of explanation of operation of the embodiment shown in FIG. 5.
FIG. 7 shows an example of the contents of a register in the embodiment of FIG. 5.
FIG. 8 is an example of audible output forms in the example of FIG. 7.

This follows the steps $n_{15} \to n_{16} \to n_5$. Because $R_1 = 5$ in the procedure $X \to X_0$ the fifth digit position data "2" is introduced into the buffer $X_0$. The steps $n_{18} n_{22}$ results in $R_1 - 1 = 4$. The step $n_{23}$ specifies the initial address of an area of the ROM containing sounds "two". The sounds "two" are produced in the steps are $n_{10}-n_{14}$. The above mentioned procedures are repeated such that the fifth digit data of the X register is introduced into the buffer $X_0$ in the step $n_5$. The development in the steps $n_6 \to n_{18} \to n_{22}$ results in $R_1 - 1 = 0$. The address counter VAC in the step $n_{23}$ specifies the initial address of an area containing sounds "six" the first digit position data). Audible sounds of the first digit position data are produced with advance to $n_{15} \to n_{16}$. $R_1 = 0$ halts all the procedures. FIG. 8 shows the order of the audible sounds produced from the loud speaker SP.

Occasionally, a calculator contains one or more mode selectors on the operation panel, for example, a tabulation selector, a normal/constant operation selector and a counting fraction selector. Through the use of the present invention it is possible to produce audible sounds indicative of the operation states of these selector. Furthermore, audible sounds indicative of the operation states of the mode selector may be produced once a power switch is thrown or a specific function key (e.g., a clear key c, is depressed.

While only certain embodiments of the present invention have been described, it will be apparent to those skilled in the art that various changes and modifications may be made therein without departing from the spirit and scope of the invention as claimed.

We claim:

1. A synthetic-speech calculator of the law-of-exponent type including means for entering numerical information, said numerical information including a mantissa portion and an index portion comprising:
    register means for storing said mantissa portion and said index portion of the entered numerical information;
    memory means for storing a set of sound related digital signals representative of said mantissa portion and said index portion of said numerical information stored in said register means; and
    means responsive to said set of sound related digital signals stored in said memory means for producing audible sounds indicative of the mantissa portion of said numerical information, the index portion of said numerical information stored within said register means and the position of the most significant digit in the index portion of said numerical information.

2. A synthetic-speech claculator including means for entering numerical information, comprising:
    register means for storing said numerical information;
    means for storing said numerical information in said register means;
    decision means for sensing the position of the most significant digit position of the numerical information stored within said register means; and
    means responsive to said decision means for producing audible sounds indicative of the numerical information stored within said register means and of said position of the most significant digit associated with said entered numerical information, said position being sensed by said decision means.

3. A synthetic-speech calculator including means for entering numerical information, comprising:
    processor means for performing operations on numerical information entered via a keyboard and producing results of said operation;
    first memory means for storing the results of said operations of said processor unit, said first memory means generating an output;
    second memory means responsive to said output from said first memory means for storing sound related digital signals said second memory means generating an output representing selected ones of said sound related digital signals selected by said output from said first memory means; and
    means responsive to an output from said second memory means for producing first and second audible sounds, said first audible sound being indicative of said entered numerical information, said second audible sound being indicative of the conditional content of said numerical information, said conditional content having a particular meaning with respect to said numerical informational alone, the conditional content of said numerical information comprising the position occupied by the most significant digit in said numerical information.

4. A synthetic-speech calculator including means for entering numerical information, comprising.
    a keyboard comprising digit keys and functions keys for entering said numerical information;
    register means for storing information entered by the depression of selected ones of the digit keys;
    read-only memory means for storing a large number of digital codes as sound related digital information signals;
    counter means responsive to an output from said register means for specifying the address of the memory means so as to remove a specific sound related digital signal from the memory means;
    a digital-to-analog converter means for converting the specific sound related digital signals removed from the memory means to an audible sound signal;
    loud speaker means driven by the audible sound signal for producing audible sounds, said audible sounds comprising a first and second audible sound, said first audible sound being indicative of said numerical information, said second audible sound being indicative of the conditional content of said numerical information, the conditional content of said numerical information having a particular meaning with respect to said numerical information in additional to the meaning of the numerical information alone, said conditional content comprising the position occupied by the most significant digit in said numerical information.

5. A synthetic-speech calculator including means for entering specialized numerical information, comprising:
    a keyboard including digit keys and function keys;

memory means for storing sound related digital signals indicative of entered and processed information;

address means responsive to actuations of said keys on said keyboard for retrieving selected ones of said sound related digital signals from said memory means and for generating a first and second audible sound signal in response thereto;

converting means for converting said first audible sound signal and said second audible sound signal into first and second audible sounds, said first audible sound representing the numerals constituting the main body of said numerical information, said second audible sound being indicative of a particular characteristic associated with said main body of said numerical information, said second audible sound representing the position occupied by the most significant digit associated with said numerical information, said first audible sound representing the numerals constituting said numerical information.

6. A synthetic-speech calculator in accordance with claim 5, wherein said numerical information comprises a mantissa portion and an index portion, said second audible sound representing said index portion of said numerical information, said first audible sound representing said mantissa portion of said numerical information.

7. A synthetic-speech calculator in accordance with claim 5 wherein said address, means comprises:

processing means responsive to actuations of said keys or said keyboard for accepting said keyed numerical information and processing said information yielding a processed result;

storage means for storing said processed result, said keyed numerical information and an identification digital code, said code being indicative of the existence of a particular characteristic associated with said numerals constituting said numerical information; and means responsive to an output said storage means for locating selected ones of said sound related digital signal in said memory means, said selected sound related digital signals generating audible sound signals representative of said keyed numerical information, said processed result of said keyed information, and generating an audible sound indicative of said particular characteristic associated with said numeral or numerals constituting said keyed numerical information.

8. A synthetic-speech calculator in accordance with claim 7 wherein said addressing means further comprises:

sensing means responsive to an output from said storage means for sensing the existence of said identification digital code in said storage means thereby generating a control signal, said control signal being input to said memory means directing said memory means to select a sound related digital signal indicative of said particular characteristic associated with said numerals constituting said numerical information, said selected sound related digital signal generating an audible sound signal indicative of said particular characteristic.

9. A synthetic-speech calculator in accordance with claim 7 wherein said particular characteristic comprises an index portion of said keyed numerical information.

10. A synthetic-speech calculator in accordance with claim 7 wherein said particular characteristic comprises:

the position occupied by the most significant digit of said keyed numerical information relative to the total number of digits capable of entry in said calculator without overflow.

* * * * *